United States Patent [19]
Maierson

[11] 3,755,064
[45] Aug. 28, 1973

[54] WATER INSOLUBLE POLYMERIC WEB STRUCTURES AND FILAMENTS CONTAINING ENCAPSULATED COMPONENTS

[75] Inventor: Theodore Maierson, Dayton, Ohio

[73] Assignee: The National Cash Register Company, Dayton, Ohio

[22] Filed: May 25, 1971

(Under Rule 47)

[21] Appl. No.: 146,804

Related U.S. Application Data

[60] Division of Ser. No. 723,285, April 22, 1968, which is a continuation of Ser. No. 659,857, Aug. 11, 1967, abandoned.

[52] U.S. Cl. ........................ 161/174, 71/3, 71/64 A, 71/64 E, 161/150, 161/DIG. 5, 252/316, 260/37 NP

[51] Int. Cl. ....... D01f 1/02, D04h 1/04, B01j 13/00

[58] Field of Search ....................... 71/3, 64 A, 64 E; 161/87, 150, 172, 174, DIG. 5; 252/305, 316; 260/37 NP, 37 P

[56] References Cited
UNITED STATES PATENTS

| | | | |
|---|---|---|---|
| 3,016,599 | 1/1962 | Perry | 161/169 |
| 2,908,659 | 10/1959 | Shashoua | 260/32.6 |
| 3,410,819 | 11/1968 | Kourtz et al. | 260/29.6 |
| 3,516,941 | 6/1970 | Matson | 252/316 |
| 2,473,528 | 6/1949 | Hoover | 161/72 |

*Primary Examiner*—Alfred L. Leavitt
*Assistant Examiner*—Robert A. Dawson
*Attorney*—Patrick P. Pacella

[57] ABSTRACT

The present disclosure is directed to formation of self-supporting, three dimensional, water-insoluble, polymeric web structures containing encapsulated components. The webs are composed of randomly associated joined monofilaments of water-insoluble polymers, said monofilaments ranging in average diameter from about 1 to 10 microns, usually from about 2 to 7 microns, on/or in which are located encapsulated components, e.g., coloring agents, perfumes, or other scents, e.g. insect sex attractants, agricultural chemicals, insecticides, pesticides, etc. Any water-insoluble web-forming polymer, including compatible polymer mixtures, can be used provided that said polymers are capable of having a self-supporting web structure, the randomly associated individual monofilaments of which are self-supporting when spanning a gap of at least 1 inch. The web-forming polymer solutions or dispersions can be dispensed from various types of dispensing systems and equipment, e.g., from spray guns, portable aerosol cans, etc., to provide a novel and advantageous way of dispensing agrictultural treating agents or other encapsulated materials onto plants or other desired repositories or locations without interfering therewith, viz., with plant growth or metabolic processes thereof. cesses thereof.

According to a preferred embodiment, the disclosure is also directed to aerosolizable formulations comprised of the polymer (or polymers) forming the web structure, a solvent (or mixture of solvents) used to dissolve the polymer, a propellent (or mixture of propellents) to propel the polymer solution from the aerosol dispensing device, and the encapsulated material which becomes imbedded in or adherent to the polymeric filaments upon formation of the web. Other optional ingredients, e.g., a plasticizer(s) can be included in the aerosolizable formulations to impart increased tackiness to the web over extended time periods.

10 Claims, No Drawings

WATER INSOLUBLE POLYMERIC WEB STRUCTURES AND FILAMENTS CONTAINING ENCAPSULATED COMPONENTS

This is a division of application Ser. No. 723,285, filed Apr. 22, 1968, which is a continuation of Ser. No. 659,857, filed August 11, 1967, now abandoned.

While the invention is described in detail hereinbelow primarily in terms of its agrecultural use, it will be realized that the webs and monofilaments containing encapsulated components can be used for a wide variety of purposes, e.g., to disseminate encapsulated shark repellent or other chemicals onto water; to deliver sea dye marker to desired areas of use in the water; to aid in police investigation and detection work (both in the fields of overt and covert area intrusion); in the arts, e.g., theatrical arts, to simulate spiderwebs; in other specialty product use areas, e.g., to trap and immobilize insects, especially flies, mosquitoes, etc. The present invention can be used whenever it is desired to deliver encapsulated components and adhere them at least temporarily.

One of the vexatious problems encountered in treating argicultural products to prevent insect and other pests from devouring plant life is that of the effective life of the treating agent, i.e., insecticide or pesticide, dispensed thereon. Thus, it is a relatively simple matter to spray plant life with insecticides, e.g., by aerial spraying, but the spraying must be repeated frequently due to the fact that the insecticide can volatilize into the open air. Frequently plant life is sprayed with insecticidal solutions and the solvent evaporates taking a portion of the insecticide along during the evaporation. Another problem involves the atmospheric deletion effect upon the insecticide, e.g., the effects that rain and wind have in removing the insecticides from the plant. Still another problem exists in maintaining liquid treating agents on the desired portion, e.g., leaves due to run-off, viz., the downward gravitational migration of the liquid insecticide from the leaves and upper plant parts to the earth. Thus it will be realized that often large portions of the agricultural treating agent applied to plant life never actually remains on the plant for a sufficient period of time to accomplish the purpose for which it was applied thereto.

One attempt to partially solve this problem involves spraying the plant with an organic polymer solution containing the agricultural treating agent. The polymer solution, being "sticky" at the time of application, enhances the adherence of the treating agent to the plant leaves and other parts so that the insecticide remains on the desired situs of use. This procedure is far from satisfactory, however, because the polymeric film frequently upsets or interfers with the plant's metabolism e.g., does not allow the plant leaves and other parts to "breathe." This inability of the plant to carry out its normal metabolism frequently results in stunted growth, other deleterious side effects, or even death of the plant.

The present invention offers an effective and efficient solution to most of the above indicated problems by providing for adherence of encapsulated treating agent(s) to the desired situs of use because the polymeric web, being tacky at the time of application of said situs, adheres thereto. Since the web is composed of tacky monofilaments and contains the encapsulated component, the encapsulated component is deposited upon and adherent to said situs without interfering with normal plant metabolism. Moreover, those portions of the web not actually adhered still retain the encapsulated material in the immediate vicinity because these web portions become mechanically interlocked in the leaves, stems and other plant parts due in part to the three dimensional or non-planar web configuration. In short, the encapsulated agricultural treating agents are placed in a condition where they are retained more efficiently by the plant life and can therefore serve to combat insects and other pests present in the locality of the plants. Also, the present invention allows the use of delayed release agricultural treating formulations which can permeate gradually through the capsule walls to be available to combat insects and pests in the area of the plant to which the webs containing the encapsulated treating agents have been applied.

According to one facet of a preferred embodiment of this invention, the polymeric webs containing the encapsulated component can be applied directly to an individual bush or plant structure by delivery from an aerosol container, e.g., conventional portable aerosol hardware (can), by an unskilled applier, e.g., the average home gardener. Thus, it will be apparent that the present invention has the added advantage of flexibility in systems and ways of delivery of the desired encapsulated components depending upon the economics involved, area to be treated and the intended end use of the encapsulated component. For example, when it is desired to treat a large field of plants; instead of delivering the web from aerosol cans, the encapsulated agricultural or other agent can be sprayed using substantially conventional aerial spraying hardware to spread the polymeric, three-dimensional "spider" webs over a wide area homogeneously. Since the webs are light in weight yet are self-supporting at the time of their formation and deposition and for varying periods thereafter (depending more or less upon the specific polymeric materials used to formulate the web-forming composition); they can be sprayed from relatively low flying aircraft in the manner in which present insecticidal compositions (unencapsulated) are applied in a hit or miss manner.

The three-dimensional web configuration formed of adherent, interconnected randomly associated monofilaments is especially advantageous in situations where it is desired to get rid of insects without using harmful chemical poisons. For example, the aerosolizable, web-forming polymeric formulation can contain encapsulated or unencapsulated insect sex attractants. The insect then crawls or flies into the three-dimensional web and is substantially retained therein due to the tackiness and interconnected structure of the web itself. For example, house flies and mosquitoes have been effectively immobilized and retained on such three-dimensional, polymeric artifical spider webs. The web, itself, without additional components is quite useful for this purpose and can be made tacky for extended periods by use of tackifying plasticizers.

WEB-FORMING COMPOSITIONS

Any water-insoluble, web-forming polymeric composition can be employed provided that it forms a web of self-supporting monofilaments capable of spanning a distance of at least one inch and preferably 3 inches or more. A wide variety of water-insoluble polymeric compositions are suitable for this purpose. They can be employed in the form of organic solutions or dispersions or in any other form so long as they can be dispensed from suitable apparatus to form the subject webs.

Suitable exemplary types of and specific rubber or elastomeric polymeric materials that can be used include, but are not limited to, the following: homopolymeric polybutadienes having number average molecular weights ranging from about 2,400 to about 3,000, e.g., "Buton 150" a commerically available polybutadiene (Enjay Chemical Company) containing chiefly (65 weight percent) the 1,2-butadiene adduct with some residual vinyl unsaturation; natural rubbers having number average molecular weights ranging from about 1,000 to 4,000, e.g., cis-1,4-polyisoprenes; "NBR" rubbers, viz., nitrile-butadiene rubbers having number average molecular weights ranging from about 900 to about 4,500 e.g., 1,3-butadiene-acrylonitrile copolymers; "SBR" rubbers, viz., styrene-butadiene rubbers having molecular weights of about 900 to about 4,500 e.g., styrene-1,3-butadiene copolymers containing 20 to 80 weight percent 1,3-butadiene; halogenated rubbers, esp. chlorinated rubbers, such as, neoprene rubbers having molecular weights of about 800 to about 5,000, e.g., homopolymeric polychloroprenes; polyalkylene homopolymers having molecular weights ranging from about 8,000 to about 200,000, especially homopolymeric polybutenes and polyisobutylenes such as "Vistanex MML 140" a commerically available polyisobutylene having a molecular weight (Staudinger) ranging from about 117,000 to about 135,000 (Enjay Chemical Company), "Vistanex MML 100" a commerically available polyisobutylene having a molecular weight ranging from about 81,000 to about 99,000 (Enjay Chemical Company), "Vistanex LM-MS" a commerically available polyisobutylene having a molecular weight of about 8,700 to about 10,000 (Enjay Chemical Company), "Vistanex 200" a commercially available polyisobutylene having a molecular weight of approximately 200,000 (Enjay Chemical Company); trans-polyisoprene homopolymers, e.g., "Trans PIP," a commerically available precipitated balata (naturally occurring) rubber (Polymer Corporation Limited); cis-1,4-polyisoprenes having molecular weights of about 2,000 to about 50,000, e.g., "Natsyn 400" a commercially available cis-1,4-polyisoprene homopolymeric synthetic rubber (The Goodyear Tire & Rubber Company); hydrocarbon terpolymers containing ethylene, propylene and a non-conjugated or conjugated diene comonomer, e.g., "Nordel," a commerically available, sulfur-curable terpolymer of ethylene, propylene and 1,4-hexadiene (E.I. du Pont de Nemours & Co.) and "Royalene" a commercially available hydrocarbon terpolymer of ethylene, propylene and a non-conjugated $C_5$ to $C_8$ diene (United States Rubber Co.).

Usually it is desirable to employ a compatible web-forming blend of a hydrocarbon or halogenated hydrocarbon elastomer and at least one resin, natural or synthetic. Suitable exemplary resins which can be used include, but are not limited to, the following types of and specific resinous material: hydrogenated rosins and various polyol esters of hydrogenated rosins, e.g., "Staybelite Resin" a commercially available hydrogenated rosin having a softening point of 68° C. (A.S.T.M. Ring & Ball), an Acid Number of 165, a Saponification Number of 167, a Refractive Index of 1,5002 and a density of 1.045 (Hercules Chemical Co.), "Staybelite 10" a commercially available glycerol ester of hydrogenated rosin having a softening point of 84° C. (Hercules Drop Method), and Acid Number of 7, an Index of Refraction of 1.532 and a specific gravity of 1.07 at 25° C./25° C. (Hercules Chemical Co.), refined highly hydrogenated rosins, e.g., "Foral AX" a commercially available hydrogenated rosin having a softening point of 75° C. (Hercules Drop Method), an Acid Number of 160, a Refractive Index of 1,4955 and containing 0.15 weight per cent abietic acid as determined by conventional ultraviolet analysis; phenolic resins, e.g., "Durez 19900" a commercially available phenolformaldehyde resin having a softening point of 90.0° C. (A.S.T.M. Ball & Ring ) and a specific gravity of 0.960 at 25° C./4° C. (Hooker Chemical Corp.); hydrocarbon resins, e.g., "Wing Tack 95" a commerically available hydrocarbon resin having a softening point of 95° C., an Acid Number of less than 1.0, an Iodine Number of 100 and a specific gravity of 0.93 (The Goodyear Tire & Rubber Co.); terpene hydrocarbon resins, e.g., "Piccolyte S-115" a commercially available terpene hydrocarbon resin having a softening point of 115° C. (A.S.T.M. Ball & Ring), a specific gravity of 0.97, an Iodine Number of 3, a Refractive Index of 1.53 and an Acid Number (maximum) of less than 1 (Pennsylvania Industrial Chemical Corp.); petroleum hydrocarbon resins, e.g., "Piccopale 100 SF" a commercially available petroleum hydrocarbon resin having a softening point of 100° C. (A.S.T.M. Ball & Ring), a specific gravity of 0.97, an Iodine Number of 60, a Refractive Index of 1.53, an Acid Number of less than 1 and a Saponification Number of less than 1 (Pennsylvania Industrial Chemical Corp.); aromatic hydrocarbon resins, e.g., "Nevchem 100" a commercially available highly aromatic hydrocarbon resin having a softening point of 100° C.(A.S.T.M. Ball & Ring), a specific gravity of 1.07 at 25° C., an Iodine Number of 62, an Acid Number of less than 1 and a Refractive Indesx of 1.59; and coumarone-indene resins, especially phenol-modified coumarone-indene resins.

According to a preferred embodiment of this invention, it has been discovered that excellent web-forming, aerosolizable compositions can be prepared by using plasticized or unplasticized mixtures of one or more elastomers with a compatible resin, e.g., a polyisobutylene having a molecular weight of 117,000 to 135,000 (Vistanex MML 140) with a hydrogenated rosin (Staybelite Resin) and including as an optional, but preferred, hydrocarbon terpolymer elastomer component a curable terpolymer of ethylene, propylene and a $C_4$ to $C_{12}$ non-conjugated or conjugated diene polymer, e.g., Nordel.

COMPATIBLE SOLVENTS

A wide variety of solvents can be employed to dissolve the web-forming polymer material(s) in accordance with this invention. Of course, the selection of the given solvent or solvent system (mixture of individual solvents and components) will be in large part dictated by the particular polymer material(s) chosen to form the web and the manner selected for applying it to the situs of use. Thus, e.g., when employing an aerosolizable web-forming polymer composition comprised of a mixture of Vistanex MML 140, Staybelite resin and Nordel; it is preferred to employ $C_5$ to $C_{12}$ hydrocarbon solvents or $C_2$ to $C_6$ halogenated hydrocarbon solvents, especially chlorinated hydrocarbons, e.g., n-pentane, n-hexane, cyclohexane, n-decane, n-dodecane, ethylene dichloride, etc. On the other hand, when other polymeric materials, e.g., styrene-butadiene, acrylonitrile-butadiene and related polymers are employed in the web-forming composition, solvents compatible with these polymer materials are employed, e.g., methyl ethyl ketone, methylene chloride and toluene. Of course, mixtures containing and two or more of the above solvents can be used. The below table indicates the type of solvent usually employed (giving a specific example of each type) for various compatible web-forming polymeric elastomer materials;

| Polymeric Material | Type of solvent | Exemplary solvent |
|---|---|---|
| Polybutadiene | Aromatic | Toluene |
| Natural Rubber | Aliphatic | Hexane |
| Polyisobutylene | Aliphatic | Hexane |
| Ethylene Propylene Terpolymer | Aliphatic | Hexane |

PROPELLANTS

These aerosolizable and sprayable polymeric compositions employed to form the filaments and webs in accordance with this invention usually employ a propellant material, especially, when delivered from an aerosol container. A wide variety of propellant materials can be used so long as the propellant material is compatible with not only the polymeric material(s) being used but also the solvent for said polymer(s). Also, when the web contains capsules, the propellant material should be inert with respect to both the cell wall material of the capsules (external) phase). While it is preferable that the propellant(s) also be inert with respect to the gaseous, liquid or solid treating agent comtained within the capsules (internal phase or encapsulated component); this is not mandatory because the cell wall separates the propellant(s), solvent(s), etc., from the internal phase material(s). According to a preferred embodiment of this invention when the web-forming polymer material is a mixture of polyisobutylene, hydrogenated rosin and a terpolymer of ethylene, propylene and 1,4-hexadiene, using n-hexane or cyclohexane as the solvent; it is preferred to employ halogenated hydrocarbon propellants, e.g., mixtures of "Freon 11" and "Freon 12." Freon 11 is Trichloromonofluoromethane. Freon 12 is Dichlorodifluoromethane. In general, any inert propellant(s) can be used so long as it is inert with respect to the polymer(s), resin(s), solvent(s) and capsule cell wall material. Other satisfactory propellants which can be used herein include, but are not limited to: vinyl chloride ("VC"), butane, isobutane, propane and mixtures of any two or more of the aforementioned propellants. When the web-forming compositions are dispensed from conventional spray guns (as contrasted with aerosal cans) it is economically preferable to use air, nitrogen, carbon dioxide or mixtures containing one or more of them as the propellant medium.

OPTIONAL ADDITIONAL INGREDIENTS

Other adjuvant materials can be included in the web-forming compositions, such as tackifying plasticizers, e.g., hydrogenated or non-hydrogenated $C_1$ to $C_6$ lower alkyl esters of organic rosin acids, e.g., hydrogenated methyl abietate; di-$C_1$ to $C_8$ lower alkyl phthalates; mono-di- and tri-$C_1$ to $C_8$ alkyl phosphates, etc. Other optional ingredients which can be included to "tailor-make" the web-forming compositions are pigments, dyes or coloring agents (to be included in the polymer formulation, per se, as distinct from the encapsulated component), filler materials, e.g., diatomaceous earth, bentonite clay, titanium dioxide (in powdered or particulate form), etc.

ENCAPSULATED COMPONENT(S)

A wide variety of solid and liquid (and gaseous) materials can be encapsulated and incorporated into the self-supporting polymer web articles of the present invention. In connection with the encapsulation disclosure contained herein, the expression "internal phase" will be employed with reference to those materials which are encapsulated, whereas the term "external phase" is used with reference to the cell wall material, viz., the material which consitutes the capsule wall of the encapsulating material. Suitable exemplary internal phase materials which can be employed in accordance with this invention include, but are not limited to, the following: pigments, dyes, inks, perfumes, adhesives, phosphorescent and fluorescent chemicals, sea dye marker, shark repellent, insecticides, insect repellants, pesticides, bacterial spores toxic to various insects, e.g., in the larvae stage, herbicides, rodenticides, termiticides, fungicides, bactericides, plant hormones (defoliants), insect sex attractants, etc. Of course, these materials can be used in unencapsulated form in the polymeric webs of this invention. Moreover, the above noted and similar encapsulated materials can be dissolved or dispersed in oils and oily or oil-type materials by encapsulation procedures known to the art, e.g., such encapsulation procedures as indicated in U.S. Pat. Nos. 2,712,507, 2,730,456, 2,730,457, 2,800,457, 2,800,458 and 3,190,837. A recommended encapsulation procedure for encapsulating rodenticides and insecticides can be found in U. S. Pat. No. 3,265,629, which indicates in detail in Example 5 a procedure for encapsulating sodium fluoroacetate (rodenticide) and in Example 9 thereof there is indicated a specific procedure for encapsulating calcium arsenate (an insecticide). Additional encapsulation procedures, both chemical and mechanical, which can be used to encapsulate various materials for use in the polymeric webs of this invention can be found in "Microencapsulation" by Anderson et al. (Harvard M.B.A. Candidates report), published by Management Reports, Boston, Mass. (1963), the disclosure of which is incorporated herein by reference.

In similar manner a wide variety of external phase (cell wall) materials can be used to encapsulate the above-mentioned and other components. Suitable exemplary encapsulating materials which can be used in accordance with this invention include, but are not limited to, the following; polyvinylidene chloride, polyethlene, ethyl cellulose, nitrocellulose, polystyrene, shellac, polyvinylalcohol, urea-formaldehyde and other aminoplast condensates, phenol-formaldehyde and other phenolic condensates, etc.

One typical procedure which can be employed to encapsulate selected encapsulated components, e.g., sodium fluorescene (sea dye marker), using ethyl cellulose as the capsule cell wall material is as follows: dissolve 4 weight parts (wt. pts.) of ethyl cellulose "N-type" (viz., having an ethoxy content of from 49.0 to 49.3 wt.%) in 200 wt. pts. of cyclohexane. Heat to 80° C . and add 4 wt pts. of "Epolene C 10," a commercially available low molecular weight polyethylene (Eastman Chemical Products Inc.), and 40 wt. pts. of sodium fluorescene (finely ground) while stirring. Continue stirring and allow slow cooling to room temperature (approximately 20° C.). Decant all excess liquid media and wash encapsulated solids with fresh cyclohexane. Spread washed solids on tray and air dry. The encapsulated solids can then be screened to exclude any material in excess of about 50 microns (diameter).

A typical encapsulation procedure for encapsulating selected encapsulated components using nitrocellulose (cellulose nitrate) as the capsule cell wall material is as follows. Prepare a 4 percent by weight solution of nitrocellulose in methyl ethyl ketone. Stir at 25° C. until a clear solution is obtained. With constant agitation add 16 wt. pts. of sodium fluorescene as a finely divided powder. While continuing the stirring at 25° C. add slowly 60 wt. pts. of "Butarez 25" a commercially available low molecular weight polybutadiene (Phillips Petroleum Co.), preheated to 50° C. Stir for an additional 15 minutes to complete phase separation and wall formation. Add 5 volume parts of t-butyl titanate and stir for 8 to 16 hours to cross-link the ethyl cellulose, thus preventing solvation by propellants. Wash with ligroine, a saturated volatile fraction of petroleum boiling in the range of 20 to 135° C. several times to remove excess polymer. Dry under ambient conditions.

Subsequent to its formation, the encapsulated component can be added to the sprayable or aerosolizable web-forming composition for dispensation thereof. One of the benefits of this invention concerning its encapsulation embodiments is that the encapsulated components can be added to the web-forming formulation and stored for extended periods prior to use without adverse effects which otherwise might occur due to intimate association of the encapsulated component with the solvent(s). propellant(s), etc.

TYPICAL FORMULATION PROCEDURE (AEROSOLIZABLE COMPOSITIONS)

The following procedure illustrates a way in which liquid insecticide can be reduced to an apparent powder (encapsulated) form and subsequently be dispensed into an aerosol web-forming dispensing system. The liquid insecticide, viz., one which is liquid at ambient temperatures, is encapsulated using the gelatin encapsulation procedure set forth hereinabove to prepare small diameter capsules in the 10 to 40 micron size range. After spray drying the capsules appear as a free flowing powder, yet contain the liquid insecticide.

An aerosolizable web-forming composition is then prepared by mixing 14.4 grams (g.) of a 5 wt. % solution of Vistanex MML 140 in n-hexane, 7.2 g. of a 5 wt. % solution of Nordel in n-hexane and 43.2 g. n-hexane. This mixture is then introduced into a 6 ounce aerosol can with a 1 inch diameter opening. To this mixture is added 1 g. of 10 to 40 micron capsules containing the liquid insecticide and the mixture is shaken to mix the ingredients. Air is expelled from the aerosol can using a stream of propellant gas. Then immediately thereafter the valve assembly is crimped into the aerosol can (neck). The valve used can be a commercially available one such as No. 041250 (Precision Valve Corp.) which has a 0.030 inch diameter orifice and a dip tube extending well to the bottom of the aerosol can. Sixty milliliters (ml.) of a propellant mixture of 65 volume percent Freon 12 and 35 volume percent VC is injectd through the valve into the aerosol can. All ingredients are then mixed by gentle shaking. An activator is then fitted on the valve stem., e.g., No. 041250 (Precision Valve Corp.), to complete the assembly. This aerosol unit will now respond to finger-tip pressure applied at the top of the applicator to deliver the web containing encapsulated insecticide to any desired situs of use. Of course, the same procedure can be used to formulate aerosolizable web-forming compositions containing an unencapsulated agricultural treating agent component, or no such component for that matter.

The below table indicates the characteristic concentration ranges for various components usually present in the aerosolizable compositions. All per cents stated herein are by weight unless otherwise noted.

| | general range % of total composition | usual range % of total composition | preferred range % of total composition |
|---|---|---|---|
| Solvent | 10 to 40 | 15 to 35 | 15 to 25 |
| Elastomer | 0.2 to 5 | 0.3 to 3 | 0.5 to 2 |
| Resin | 2 to 10 | 2 to 8 | 3 to 5 |
| Propellant | 40 to 85 | 50 to 80 | 60 to 75 |
| Active suspended ingredient, e.g. agricultural agent | 0.25 to 8 | 0.25 to 6 | 0.25 to 5 |

TYPICAL FORMULATION PROCEDURE (SPRAYABLE COMPOSITIONS)

A solvent mixture of 60 percent "MEK" (methyl ethyl ketone) and 40 percent toluene is employed to dissolve and form a mixture containing 3 percent "Hycar 1072" and 1 percent "Hercolyn D." Hycar 1072 is a commercially available butadiene-acrylonitrile rubber modified to contain carboxyl groups (B. F. Goodrich Co.). It has a specific gravity of 1.00 and a Mooney viscosity of 46 to 62. Hercolyn D is a commercially available plasticizing resin which is a pale viscous liquid, the hydrogenated methyl ester of rosin abietic acid (Hercules Powder Co., Inc.). This mixture can be used as a sprayable "base solution" in which a variety of encapsulated or unencapsulated treating agents can be suspended. The mixture of polymers, solvent(s) and treating agent(s) is then transferred to the cup of a conventional spray gun and pressured, e.g., to from 25 to 50 pounds per square inch with nitrogen, air or other conventional pressuring media. Upon spraying, web structures containing the treating agent(s) are produced. Pressure is adjusted to obtain optimum results, depending on the specific formulation used. The below table gives characteristic concentration ranges for components usually present in sprayable compositions.

| | general range % of total composition | usual range % of total composition | preferred range % of total composition |
|---|---|---|---|
| Solvent | 60 to 95 | 80 to 95 | 85 to 95 |
| Polymer(s) (elastomer(s)) | 3 to 8 | 3 to 6 | 3 to 5 |
| Resin | 3 to 10 | 4 to 10 | 5 to 10 |
| Active suspended ingredient | 0.25 to 6 | 0.25 to 6 | 0.25 to 5 |

The invention will be illustrated in greater detal in the examples which follow. It should be understood that the purpose of these examples is to illustrate the present invention. Accordingly, they should not be considered limiting.

EXAMPLE 1

This examle illustrates a typical aerosolizable composition and the formation of a self-supporting, three dimensional polymeric web therefrom.

A polymer base formulation is prepared by dissolving ten grams of Staybelite Resin along with 20 grams of a 10 percent by wt. solution of Vistanex MML-100 in n-hexane in 30 grams of n-hexane. To 20 grams of the above noted polymer base formulation (placed in an aerosol can) is added 15 ml. of Freon 11. After securing the valve, 30 ml. of Freon 12 is added under pressure in the aerosol can. The above formulation was then aerosolized onto a set of wires arranged in parallel to one another but spaced approximately 3 inches apart and located essentially in the same plane. A self-supporting, three dimensional web structure is formed of random monofilaments. The monofilaments measure from 2 to 7 microns in diameter and are arranged in random fashion adhesively attached and interconnected to one another. In sunlight (or artifical light) this web closely resembles a spider web, but it is three dimensional whereas a spider web is two dimensional (usually), in a curved locus. The three-dimensional web, even though it contains no agricultural treating agents or insecticide, is useful to catch and immobilize small insects, e.g., housefiles, fruitflies and mosquitoes.

EXAMPLE 2

This example illustrates the formation of a tacky three-dimensional, self-supporting web similar to that of Example 1, but containing an encapsulated component.

The formulation procedure of Example 1 is followed but using a web-forming composition of 3.6 grams Staybelite Resin, 3.6 grams Vistanex MML-100 (5 wt. % solution in n-hexane), 1.6 grams Nordel (5 wt. % solution in n-hexane) and 0.5 grams of "Hercolyn D" (hydrogenated methyl abietate) dissolved in 6 grams of n-hexane. To this formulation is added 5 grams of an encapsulated dye. The encapsulated dye component is a solution containing 2 wt. % of benzoleucomethylene blue and 2 wt. % of Crystal violet lactone wherein the solvent is a 50-50 mixture of "Magnaflux Oil" and "Arochlor 1242. Magnaflux Oil is a commercially available high boiling refined kerosene (Shell Chemical Co.) and Arochlor 1242 is a commercially available chlorinated biphenyl (Monsanto Co.). This internal phase is encapsulated using the following conventional gelatin encapsulation procedure to produce capsules in the size range of 5 to 15 microns. One hundred eighty milliliters of an aqueous gel sol containing 11 wt. % gelatin is mixed with 180 milliliters of an aqueous gum arabic sol containing 11 wt. % gum arabic. The gelatin employed is a high bloom strength (275 minimum) pork skin acid-extract gelatin. The aqueous gel sol and gum arabic sol are prepared and mixed at a temperature of approximately 55° C. Then the mxture is added to 1,000 milliliters of distilled water (maintained at approximately 55° C.) in an appropriate size beaker. Then 200 milliliters of the internal phase liquid (colorless dye solution) is added to the diluted gelatin-gum arabic sol. (When the internal phase is a solid, approximately 200 grams of the solid are added). The diluted sol containing the material to be encapsulated is stirred vigorously to adjust to the proper drop size. Then the temperature is allowed to drop gradually over a 2 to 3 hour period to 22°–25° C. Then the temperature of the coacervate is chilled to 10° C. After this, 10 milliliters of a 25 wt. % aqueous gluteraldehyde solution is added to the coacervate solids to effect cross-linking of the gelatin cell wall material. Then the coacervate is stirred for from 6 to 24 hours. "Nalcoag 1035, " a commercially available 40 wt. % colloidal silica suspension (Nalco Chemical Co.) is added to the coacervate prior to spray drying on a basis of 10 wt. % Nalcoag 1035 solids on total coacervate (encapsulated) solids. The propellant is a mixture of 35 volume % vinyl chloride and 65 volume percent Freon 12.

The aerosolizable composition is placed in a conventional aerosol can as in Example 1. Using the same parallel wires device (3 inch gap between wires) a self-supporting, three-dimensional web is formed upon aerosolization. The monofilaments have average diameters of 2 to 7 microns and are randomly associated within the tacky web structure. Upon breakage of the capsules and release of the internal phase, the previously colorless dye turns blue due to reaction with the silica overcoat. Thus the instant tacky web containing an encapsulated colorless dye which exhibits latent color upon capsule rupture, is useful to indicate are intrusion (and in overt detection work in general).

EXAMPLE 3

The web-forming polymer composition of Example 2 is formulated in accordance with the procedures of Examples 1 and 2 but containing 5 grams of a fluorescent solid pigment as the encapsulated component. The pigment employed is "Fluorescent Pink Pigment Velva-Glo," a commercially available pink fluorescent pigment in a urea-formaldehyde resin base (Radiant Color Co.) and the encapsulation medium is gelatin (external phase). The propellant is VC-12 Blend, 20 mis. By encapsulating the pigment the deteriorating effect frequently experienced in the presence of organic hydrocarbon solvents, is minimized.

This web-forming composition is then introduced into a conventional aerosol can as noted in Examples 1 and 2. The web is formed by activating the can valve, and the web is applied onto a botanical support from a distance of about three feet. The web adequately supports the encapsulated component and the web, itself, is sufficiently tacky to ahdere to said support. The web remains tacky, self-supporting and ahderent for a period of at least 8 hours. While the encapsulated material in this example is a fluorescent pigment. It is clear that agricultural treating agents could be present as the internal phase in the capsule, e.g., herbicides, fungicides, insecticides, pesticides, etc.

EXAMPLES 4 to 23

Using the procedure of Examples 1 and 2, a variety of internal phase materials are formulated into the web-forming aerosolizable composition of Example 2. In Example 4, unencapsulated titanium dioxide particles having a diameter of 1 to 10 microns are used. In Example 13, unencapsulated sodium fluorescene (sea dye marker) is incorporated into the web-forming polymer formulation. In the remaining examples, the treating agent or included material is encapsulated using the below listed capsule cell wall material.

| Example | Treating Agent or Material | capsule cell wall material |
|---|---|---|
| 4 | TiO$_2$(decorative artificial "spider" web) | |

| | | |
|---|---|---|
| 5 | "Chlordane" (termiticide and ant killer), 1,2,4,5,6,7,8,8-octachloro-4,7-methane 3-alpha, 4,7,7-alpha tetrahydroindane | gelatin |
| 6 | "2,4-D" (defoliant), 2,4-dichloro phenoxy acetic acid | gelatin |
| 7 | "2,4,5-T" (defoliant), 2,4,6-tri-chloro phenoxy acetic acid | gelatin |
| 8 | "PMA" (defoliant), phenylmercuric acetate | gelatin |
| 9 | "DDT" (insecticide), dichlorodiphenyl trichloroethane | gelatin |
| 10 | Pine Oil (odorant), mixture of tertiary and secondary terpene alcohols, specific gravity 0.927 - 0.940, refractive index 1.4780 - 1.4820, distillation range 200° – 225° C. | gelatin |
| *11 | Sodium fluorescene (sea dye marker) | |
| ** | Sodium fluorescene (sea dye marker) | ethyl cellulose |
| 13 | Urea (plant nutrient) | ethyl cellulose |
| 14 | N, N'-diethyl toluimid (insect repellant) | gelatin |
| 15 | N,N'-diethyl toluimid, 10 wt. % solution in neutral mineral spirits | gelatin |
| 16 | Alpha-ethylbenzyl butyrate (sex attractant - Mediterranean fruit fly) | gelatin |
| 17 | Methyl eugenol (sex attractant - Oriental fruit fly) | gelatin |
| 18 | Camphor (cat repellant) | gelatin |
| 19 | Paradichlorobenzene (dog repellant) | gelatin |
| 20 | Bone oil (dog repellant), mixture of chiefly hydrocarbons, pyridine bases and amines, specific gravity 0.900 - 0.980 | gelatin |
| 21 | Oil of Sassafras (dog repellant), mixture of chiefly safrole, eugenol, camphor, pinene and phellandrene | gelatin |
| 22 | Allyl isothiocyanate | gelatin |
| 23 | Bacillus thuringiensis, var. *thuringiensis* Berliner (pathogenicide for the European core boter, *Ostrinia nubilalis* (Hubner) larvae | ethyl cellulose |

*(11) The polymeric web enables the sea dye marker to float longer than the marker "ex" the web thus allowing it to stay in the marked area longer.

**(12) The advantages of (11) are secured plus the additional advantage of gradual release of the sea dye marker due to solubilization of the ehtyl cellulose cell wall material. Thus a selected portion of the capsules can have thicker cell walls than others giving a timed release.

While the preceding examples illustrate the present invention in great detail, it should be understood that this invention in its broadest aspects is not necessarily limited to the specific elastomers, resins, solvents, propellants, internal phase an external phase encapsulation material, encapsulation procedures, etc., present in these examples. For example, the self-supporting, three dimensional polymeric webs can contain a profusion (thousands to hundreds of thousands to millions and more) of individual minute capsules (microcapsules) having diameters ranging in size from 1 to 100 microns. Usually the individual capsules have diameters of about 5 to 50 microns and preferably about 10 to 40 microns. Similarly instead of the elastomer of resin being a single elastomer or resin material, compatible mixtures of any two or more of the herein mentioned elastomers or resins can be employed as the elastomer and resin components, respectively. In similar manner the encapsulated component can actually be a profusion of individual capsules which contain a plurality of internal phase materials. Hence the webs (and monofilaments) can contain both a plurality of individual capsules, some of which contain one internal phase material and some of which contain a plurality of internal phase materials in each individual capsule.

What is claimed is:

1. A self-supporting, water-insolube, elastomer-compatible resin monofilament having an average diameter of about 1 to about 10 microns, said monofilament being self-supporting over a span of at least one inch and said monofilament containing encapsulated component present as individual capsules having diameters ranging from 1 to 100 microns.

2. A self-supporting monofilament according to claim 1 wherein said elastomer is hydrocarbon elastomer.

3. A self-supporting monofilament according to claim 1 wherein said encapsulated component comprises agricultural treating agent.

4. A self-supporting monofilament according to claim 1 wherein said encapsulated component comprises colorless dye prossessing latent color.

5. A water-soluble, self-supporting, three-dimensional elastomer-compatible resin web of randomly associated, joined monofilaments ranging in average diameter from about 1 to 10 microns, said monofilaments being self-supporting over a span of at least one inch and said monofilament containing encapsulated component present as individual capsules having diameters ranging from 1 to 100 microns.

6. A web according to claim 5 wherein said elastomer-compatible resin contains a tackifying plasticizer.

7. A web according to claim 5 which contains encapsulated component present as individual capsules having diameters ranging from 1 to 100 microns.

8. A web according to claim 5 wherein said elastomer is hydrocarbon elastomer.

9. A web according to claim 5 wherein said encapsulated component comprises agricultural treating agent.

10. A web according to claim 5 wherein said encapsulated component comprises colorless dye possessing latent color.

* * * * *

UNITED STATES PATENT OFFICE
CERTIFICATE OF CORRECTION

Patent No. 3,755,064            Dated August 28, 1973

Inventor(s) THEODORE MAIERSON

It is certified that error appears in the above-identified patent and that said Letters Patent are hereby corrected as shown below:

Claim 1, line 1, "water-insolube" should be ---water-insoluble--.
Claim 4, line 3, "prossessing" should be ---possessing---.
Claim 5, line 1, "water-soluble" should be --- water-insoluble---.
Claim 5, line 6, "monofilament" should be ---monofilaments---.

Signed and sealed this 1st day of January 1974.

(SEAL)
Attest:

EDWARD M. FLETCHER, JR.
Attesting Officer

RENE D. TEGTMEYER
Acting Commissioner of Patents